United States Patent
Lamer et al.

(10) Patent No.: US 8,351,393 B2
(45) Date of Patent: Jan. 8, 2013

(54) SWITCHING OF MULTIMEDIA SESSIONS FROM A MOBILE TERMINAL

(75) Inventors: Bastien Lamer, Lannion (FR); Isabelle Bazon, Lannion (FR); Nicolas Bihannic, Trebeurden (FR)

(73) Assignee: France Telecom, Paris (FR)

( * ) Notice: Subject to any disclaimer, the term of this patent is extended or adjusted under 35 U.S.C. 154(b) by 781 days.

(21) Appl. No.: 12/374,152

(22) PCT Filed: Jul. 6, 2007

(86) PCT No.: PCT/FR2007/051612
§ 371 (c)(1),
(2), (4) Date: Jan. 16, 2009

(87) PCT Pub. No.: WO2008/009838
PCT Pub. Date: Jan. 24, 2008

(65) Prior Publication Data
US 2009/0303964 A1     Dec. 10, 2009

(30) Foreign Application Priority Data

Jul. 18, 2006   (FR) ...................................... 06 53007

(51) Int. Cl.
*H04W 4/00*        (2009.01)
(52) U.S. Cl. ........................................ 370/331; 455/436
(58) Field of Classification Search .................. 370/331; 455/436
See application file for complete search history.

(56) References Cited

U.S. PATENT DOCUMENTS

| | | | |
|---|---|---|---|
| 6,594,699 B1 | 7/2003 | Sahai et al. | |
| 2004/0116120 A1* | 6/2004 | Gallagher et al. | 455/436 |
| 2005/0153698 A1* | 7/2005 | Sahim et al. | 455/444 |
| 2006/0025151 A1* | 2/2006 | Karaoguz et al. | 455/455 |

FOREIGN PATENT DOCUMENTS

| | | |
|---|---|---|
| EP | 1 622 315 | 2/2006 |
| WO | WO 2006/028456 | 3/2006 |

\* cited by examiner

*Primary Examiner* — Sai-Ming Chan
(74) *Attorney, Agent, or Firm* — Cozen O'Connor

(57) ABSTRACT

A method of switching a multimedia session from a mobile terminal (2) connected to a mobile communications network (21) to an indoor device (11; 12; 13; 14) connected to an indoor local area network (150) including an indoor gateway (15), the mobile terminal (2) and the indoor gateway (15) being connected to an application system (20) that sets up multimedia sessions. The method includes setting up a first multimedia session between the mobile terminal (2) and the application system (20) via the mobile communications network (21). The mobile terminal (2) detects the proximity of the indoor local area network (150). Indoor devices (11-14) are selected that are capable of supporting the first multimedia session in progress on the mobile terminal (2). The mobile terminal (2) validates an indoor device from the selected devices. A second multimedia session is set up between the validated indoor device and the application system (20), and the first multimedia session is closed.

16 Claims, 3 Drawing Sheets

SWITCHING OF MULTIMEDIA SESSIONS FROM A MOBILE TERMINAL

RELATED APPLICATIONS

This is a U.S. National Phase Application under 35 USC §371 of International Application PCT/FR2007/051612, filed on Jul. 6, 2007.

This application claims the priority of French application no. 06/53007 filed on Jul. 18, 2006, and the content of which is hereby incorporated by reference.

FIELD OF THE INVENTION

The present invention relates to multimedia services, such as conversation-based and instant messaging services and broadcasting of audiovisual programs, which services are accessible via a mobile terminal, for example a mobile telephone, a communicating personal digital assistant (PDA), a SmartPhone, etc., and via a fixed device, for example a PC, a TV, etc.

The invention relates more particularly to switching solutions offered to a mobile user with a view to optimizing continuation of a multimedia session initiated outdoors from a mobile terminal via a mobile communications network (for example a GSM, GPRS, UMTS, I-WLAN, etc. network) when the mobile terminal enters an indoor environment including fixed devices able to support the multimedia session in progress.

BACKGROUND OF THE INVENTION

Telecommunications equipment manufacturers are now offering a number of fixed-mobile convergence solutions for convergence of services and networks from fixed and mobile networks and these solutions are beginning to be rolled out commercially by telecommunication carriers.

However, those equipment manufacturer solutions are not always taken up by the standardization organizations (such as the Third Generation Partnership Project (3GPP) in the field of mobile networks or the ETSI (TISPAN) in the field of fixed networks), and therefore remain proprietary solutions, i.e. solutions that are limited to enriched multimedia services specific to the terminals supplied by the equipment manufacturer and that do not allow for the use of simple services such as an instant messaging session with sharing of contents between a number of users if the environment is not entirely compatible with the solution of the equipment manufacturer.

Moreover, the applicable mobile communication standards (see in particular the 3GPP document TS 23.228 V6.4.1 (2004-01), Third Generation Partnership Project; Technical Specification Group Services and System Aspects; IP Multimedia Subsystem (IMS); Stage 2 (Release 6)>>) propose fixed-mobile convergence with user mobility support based on an IP Multimedia Subsystem (IMS) architecture that is specific to the mobile network and has been taken up and adapted by the ETSI (TISPAN) to take account of specific features of fixed networks. However, the fixed-mobile convergence approach envisaged in the current (3GPP) mobile communication standards consider only the situation where a user moves from an outdoor environment to an indoor environment using the same terminal.

Current solutions, whether proprietary or based on standards, at best enable a user having a multimedia session in progress on their mobile terminal when entering an indoor environment equipped with a fixed local area network to continue that multimedia session on the fixed local area network of the indoor environment, instead of the mobile network on which it was initiated, and using the same terminal. Fixed-mobile convergence is effected only at the information transport network level, the user's session using the fixed network instead of the mobile communications network as soon as the user is connected to the indoor local area network.

Consequently, to offer users switching solutions that are optimized in particular in terms of cost, ergonomics, resources, etc., none of the solutions currently proposed takes account of indoor devices available in an indoor local area network. Users approaching an indoor local area network may nevertheless prefer to transfer their multimedia sessions in progress to a device of the indoor local area network more suitable for those sessions.

OBJECT AND BRIEF DESCRIPTION OF THE INVENTION

The present invention proposes a solution enabling a mobile terminal user to use resources available in an indoor environment for a multimedia session in progress on their mobile terminal when they enter the local area network of that environment.

To this end, one aspect of the invention is directed to a method of switching a multimedia session from a mobile terminal connected to a mobile communications network to an indoor device connected to an indoor local area network including an indoor gateway, the mobile terminal and the indoor gateway being connected to an application system that sets up multimedia sessions, said method including a step of setting up a first multimedia session between the mobile terminal and the application system via the mobile communications network, and it further includes the following steps:

a) the mobile terminal detecting the proximity of the indoor local area network;

b) selecting indoor devices capable of supporting the first multimedia session in progress on the mobile terminal;

c) the mobile terminal validating an indoor device from the selected devices;

d) setting up a second multimedia session between the validated indoor device and the application system;

e) closing the first multimedia session.

The above-described method enables users entering an indoor environment to switch one or more multimedia sessions in progress on their mobile terminal to a device of the indoor local area network. Thus, with or without interrupting the service provided via the multimedia session in progress (i.e. without interruption perceptible to the user), the user can obtain the benefit of the capabilities of the devices available in the indoor local area network by choosing the device most suitable for the session (in terms of the device's data processing, display, audio, etc. capacities). Moreover, the user can also benefit from a reduction in call costs by using a service via a fixed network rather than a mobile network.

The method of the invention enables carriers with which users initiate multimedia sessions from their mobile terminals to encourage customer loyalty by offering new and innovative services available to the users regardless of the access network they are using. The carrier can further guarantee users continuity of service regardless of their environment (outdoor or indoor) and thus retain clients throughout a multimedia session.

According to one aspect of the invention, the method further includes, after the step a) and before the step b), a step a1) of the mobile terminal sending the indoor gateway of the indoor local area network data relating to setting up the first multimedia session in progress on the mobile terminal. Thus, in the step b), the indoor gateway can select one of more indoor devices as a function of this data and the capacities of the indoor devices connected to the indoor local area network to support the first multimedia session. If necessary, if the capacities of the available indoor terminals are at least equivalent to those of the mobile terminal, a second multimedia session can be defined between the application system and the indoor terminal.

According to another aspect of the invention, the indoor gateway determines the capacities of the indoor devices connected to the indoor local area network regularly or in response to reception of the data relating to setting up the first multimedia session, so that the user can be offered a list of suitable devices that are actually available for switching at that time.

In the step d), the second multimedia session can be set up in response to a multimedia session set-up request sent by the mobile terminal to the application system or in response to a multimedia session set-up request sent by the indoor gateway.

In the former situation, data relating to setting up the second multimedia session between the validated indoor device and the application system is sent by the indoor gateway to the mobile terminal. Users can therefore control the time of switching, for example by initiating switching only when they are physically present in front of the chosen indoor device.

Another aspect of the present invention provides a mobile terminal including means for detecting the wireless field of an access hub to an indoor local area network, said indoor local area network including indoor devices connected to an indoor gateway and means for exchanging data with said gateway via a wireless connection with the access hub;

wherein the terminal further includes means for responding to detection of the wireless field by sending said indoor gateway information relating to setting up a multimedia session in progress between said mobile terminal and an application system.

With this kind of mobile terminal, when users enter an indoor environment, they can switch their multimedia session in progress to an indoor device of the local area network and consequently obtain the benefit of continuity of service without being obliged to continue the session on their mobile terminal.

According to one aspect of the invention, the terminal further includes means for displaying a list of indoor devices sent by the indoor gateway and means for selecting indoor devices from said list. Users can therefore choose the indoor device on which they wish to continue their multimedia session.

The mobile terminal can further include means for sending a request to set up a new multimedia session between the selected indoor device and the application system, said request being based on the information relating to setting up the multimedia session in progress between said mobile terminal and the application system. It is then the user who decides when to switch.

Another aspect of the invention provides a computer program product downloadable from a communications network and/or stored on a computer-readable medium and/or executable by a microprocessor of the above mobile terminal, the program including program code instructions for responding to detection of the wireless field by sending said indoor gateway information relating to setting up a multimedia session in progress between said mobile terminal and an application system.

The computer program product further includes instructions for displaying a list of indoor devices sent by the indoor gateway and means for selecting indoor devices from said list.

The computer program product may further include instructions for sending a request to set up a new multimedia session between the selected indoor device and the application system, said request being based on the information relating to setting up the multimedia session in progress between said mobile terminal and the application system.

Another aspect of the invention provides an indoor gateway connected to indoor devices in an indoor local area network, the gateway being characterized in that it includes means for determining the capacities of the indoor devices connected to said indoor local area network and for determining a list of indoor devices able to support a multimedia session in progress between a mobile terminal and an application system as a function of the determined capacities and the data relating to setting up the multimedia session in progress.

By means of the indoor gateway of the invention, indoor local area network devices are managed dynamically, so that the capacities of the indoor local area network that are actually available are known at all times.

According to one aspect of the invention, the gateway further includes means for sending a request to set up a new multimedia session between an indoor device and the application system, said request being based on the information relating to setting up the multimedia session in progress between said mobile terminal and the application system.

Another aspect of the invention provides a computer program product downloadable from a communications network and/or stored on a computer-readable medium and/or executable by a microprocessor of the above indoor gateway, wherein the product includes instructions for determining the capacities of the indoor devices connected to the indoor local area network and determining a list of indoor devices able to support a multimedia session in progress between a mobile terminal and an application system as a function of the determined capacities and data relating to setting up the multimedia session in progress.

The computer program product may further include program code instructions for sending a request to set up a new multimedia session between an indoor device and the application system, said request being based on the information relating to setting up the multimedia session in progress between said mobile terminal and the application system.

This program may be stored on a storage medium.

BRIEF DESCRIPTION OF THE DRAWINGS

Other features and advantages of the invention emerge from the following description of particular embodiments of the invention, chosen by way of non-limiting example, which description is given with reference to the appended drawings, in which.

DETAILED DESCRIPTION OF EMBODIMENTS OF THE INVENTION

The invention is intended to enable one or more multimedia sessions in progress on a mobile terminal that is connected to a mobile telecommunications network to be switched to an indoor device that is part of an indoor local area network.

A multimedia session is any continuous period of communication during which a user accesses one or more media, such as voice, text, image, video, etc., from a terminal. For example, a multimedia session may be a telephone conversation, an instant messaging conversation (chat), a videophone conversation, broadcasting an audiovisual program, etc.

Figure 1:
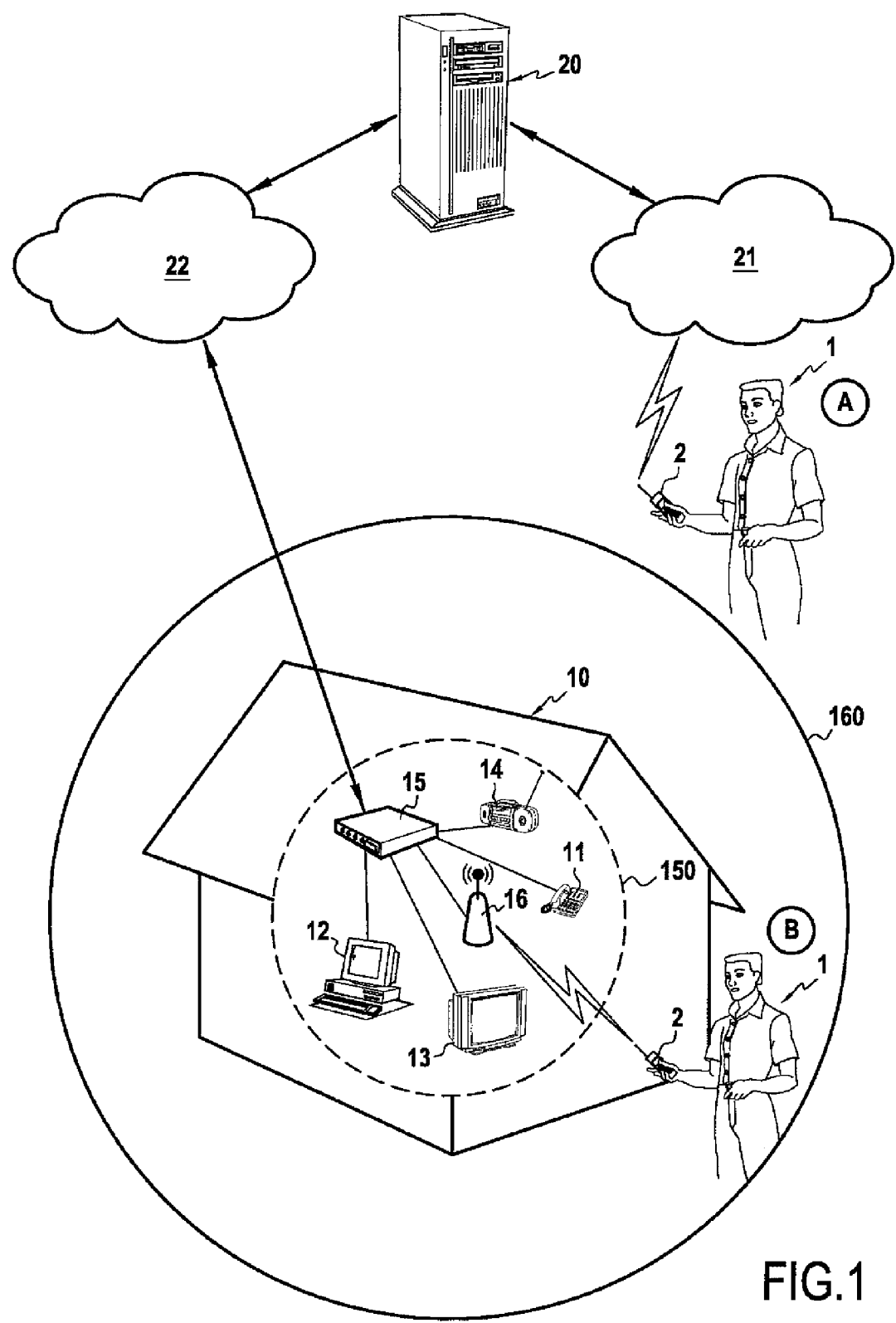
FIG. 1 is a diagram of a system conforming to one embodiment of the invention.

FIG. 1 shows a system conforming to one embodiment of the invention. The elements in FIG. 1 implementing the multimedia session switching method of the invention are a user 1 equipped with a mobile terminal 2 (for example a mobile telephone, a personal digital assistant (PDA), a SmartPhone, etc.), an indoor environment 10 (for example a home, a public place (train station, airport, restaurant, etc.)) including indoor devices such as a fixed telephone 11, a PC 12, a TV 13, an audio player 14, an indoor gateway 15, a wireless hub 16 (for a example a WiFi™ hub) whose wireless field covers an indoor wireless area 160, and an application system 20. The fixed telephone 11, the PC 12, the TV 13, the audio player 14, the wireless hub 16, and the indoor gateway 15 to which they are connected form an indoor local area network 150. In FIG. 1, the external environment comprises everything outside the indoor wireless hot-spot 160.

The application system 20, which can be implemented on a remote server, is intended to manage setting up and continuing multimedia sessions involving a user on their mobile terminal (sessions initiated by users or incoming sessions addressed to users). The application system 20 can be an IP Multimedia Subsystem (IMS) system, for example, which is a known standardized Next Generation Networking (NGN) architecture for telephone carriers providing fixed and mobile multimedia services. This system uses the Voice over Internet Protocol (VoIP) technology based on a standardized Third-Generation Partnership Project (3GPP) Session Initiation Protocol (SIP) running on top of a standard Internet Protocol (IP). The IMS architecture supports existing telephone systems and enables users to use multimedia services when moving in an outdoor environment (roaming) and in an indoor environment. To this end, the IMS architecture uses the standard IP protocols defined by the Internet Engineering Task Force (IETF). Thus a multimedia session is set up using exactly the same protocol whether it is between two IMS users, between one IMS user and an Internet user, or between two Internet users. The service development interfaces are also based on the IP protocols.

The architecture of an INS system, the various entities of such systems, registration of user devices with an INS system, and setting up a multimedia session in an INS system are described in detail in the document EP 1 560 368 (or U.S. Ser. No. 11/046,480), in the document <<3GPP TS 23.228 V6.4.1 (2004-01), Third Generation Partnership Project; Technical Specification Group Services and System Aspects; IP Multimedia Subsystem (INS); Stage 2 (Release 6)>>, available at the Internet address http://www.3gpp.org/ftp/specs/archive/23_series/23/228/, and in the IETF working group document RFC 3261, available at the Internet address http://www.ietf.org/rfc.

The application system 20 and the mobile terminal 2 are connected via a mobile communications network 21 (for example a GSM, GPRS, UMTS, I-WLAN, etc. network) and the application system 20 and the indoor gateway 15 are connected via a fixed communications network 22 (for example a PSTN, XDSL, HFC, FTTH, etc. network).

The indoor gateway 15 is the interface between an extensive network such as the fixed communications network 22 (wide area network (WAN) interface) and a local area network such as the indoor local area network 150 (local area network (LAN) interface). It is the central point of all media streams: telephone, data, video, image, music, etc. In a manner known in the art, an indoor gateway, for example the LiveBox™ indoor gateway from France Telecom™, controls all indoor devices via wire or wireless connections (for example a WiFi™ connection) to broadcast to the devices media incoming streams entering the indoor local area network. An example of this kind of indoor gateway is described in detail in the document WO 2005/112365.

According to the invention, the indoor gateway 15 also has specific functions enabling it to know in real time the indoor device resources of the local area network in order to propose indoor devices able to support the multimedia session in progress on the user's mobile terminal, for switching when the terminal enters the indoor wireless hot-spot 160. To this end, the indoor gateway 15 can keep a permanently up-to-date table for managing the indoor local area network 150 that includes in particular the presence of indoor devices connected to the indoor local area network, the IP addresses assigned to the devices, the characteristics of multimedia sessions in progress in the indoor local area network, and the compression/decompression algorithms (codecs) used, for example the M-JPEG codec. Permanent management of a table is not obligatory, as the indoor gateway can equally well establish the above information instantaneously when necessary. The indoor gateway is further adapted to exchange data with the mobile terminal 2 via the wireless hub 16, in particular to send the mobile terminal a list of indoor devices able to support the multimedia session in progress on the mobile terminal and to receive information on the indoor device selected from that list from the mobile terminal. These functions are integrated into the indoor gateway in the form of computer instructions.

Furthermore, before this service is put into place, the mobile terminal is provided with means for producing an association (a pairing) with the wireless hub 16 forming the wireless access point of the indoor gateway 15, here in order to detect the indoor wireless hot-spot 160. To this end, the mobile terminal 2 recognizes the network forming the indoor wireless hot-spot 160. If the indoor wireless hot-spot is a WiFi™ field, for example, the mobile terminal is adapted to note the identifier (SSID) of the WiFi™ network, which is broadcast periodically by the access point (the wireless hub 16). According to the invention, the mobile terminal 2 includes application or client software for monitoring reception of the identifier of the wireless network constituting the indoor wireless hot-spot. The indoor wireless hot-spot 160 is detected by the mobile terminal in a manner known in the art in accordance with protocols and principles defined by the type of connection being used (e.g. WiFi™). The general principle is that the mobile terminal 2 is in detection mode, listening out for a radio signal transmitted by the access point consisting of the wireless hub 16.

Moreover, in a WiFi™ network, the security of the association between the mobile terminal and the access point to the wireless network of the indoor wireless hot-spot can be strengthened by using Wired Equivalent Privacy (WEP) and WiFi™ Protected Access (WPA) keys corresponding to well-known security protocols defined in the IEEE 802.11 standard and the IEEE 802.11i standard, respectively.

Figure 2:
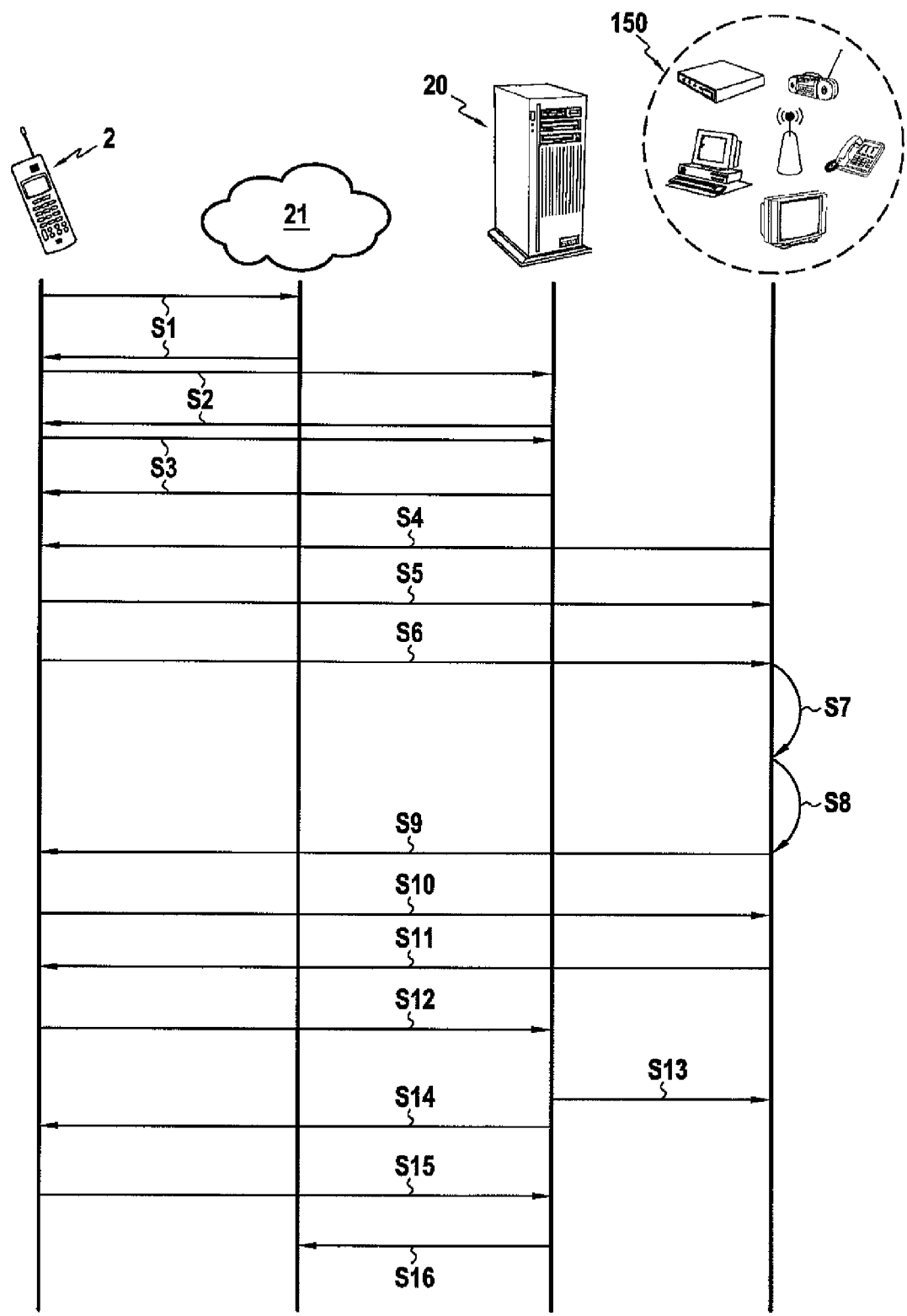
FIG. 2 shows the sequence of steps executed in a multimedia session switching method conforming to one embodiment of the invention.

A method of switching multimedia sessions conforming to one embodiment of the invention that is used in the FIG. 1 system is described below with reference to FIG. 2.

For simplicity, it is considered here that:
  there is only one wireless access point to the indoor wireless hot-spot 160: the wireless hub 16;

the user 1 has only one multimedia session A in progress at the time of switching; and switching is effected only to an indoor device of the indoor local area network 150.

In the embodiment described with reference to FIG. 2, switching the multimedia session to the application system is triggered by the user's mobile terminal. Here the service considered as the subject matter of the multimedia session is a conversational service such as an instant messaging conversation (chat) service between two users.

Initially (step S1), the user 1 logs onto the mobile communications network 21 in an outdoor environment, i.e. accesses said network when outside the indoor wireless hot-spot 160. The mobile communications network can be a well-known Universal Mobile Telecommunications system (UMTS) network, for example, which the mobile terminal accesses by connecting to a GPRS support node (SGSN) of their carrier by the procedure described in the document TS 33.102 (Security Architecture). The home location register (HLR) database which stores the data of the user's network profile generates authentication vectors that are sent to the SGSN, which is followed by mutual authentication between the terminal and the SGSN.

After logging onto the mobile communications network 21, the user 1 is registered with the application system 20 (step S2). To be more precise, to obtain the benefit of the multimedia services to which they subscribe via their carrier, the user 1 registers with the IMS that is the instantiation of the application system (chosen here by way of example). The connection to the INS is effected by registering the user using the SIP Register method specified by the IETF and defined in RFC 3261. One item of data used as a parameter is the public identity of the user, which is used to identify the user to third-party users (users can have a number of public identities). Registering the user with the application system 20 enables them to receive requests from a fixed or mobile network to set up multimedia sessions initiated by third-party users, such as a request to set up a chat session, for example.

The user 1 then submits a request to set up a multimedia session A between their mobile terminal 2 and the application system 20 (step S3). In a manner known in the art, the user 1 sends an INVITE request to set up this multimedia session from their terminal (this method is described in RFC 3261). The important data corresponding to the parameters of this request comprises:

the public identity of the calling user, and that of the called party in the event of a conversational service;

the Contact parameter enabling the network to route information (signaling and media data) relating to the session to the terminals used by the users for the session concerned; and the characteristics of the medium required by the caller for this session, namely: the media type (voice, image), the quality of service required, in particular by defining codecs for the activated media, the presentation of the IP address of the terminal, and send and receive ports for the media used.

All these parameters are described in the Session Description Protocol (SDP) section of the INVITE method defined in RFC 2327. Parameters of the medium between users are negotiated before setting up the session. In the mobile network, setting up the multimedia session is handled by a resource reservation mechanism. In a UMTS mobile network, this reservation of resources corresponds to activating the Packet Data Protocol context (PDP context) between the terminal and the gateway GPRS support node (GGSN) of the carrier for transferring the medium, thereby providing a guaranteed quality of service for the multimedia session.

The user 1 in the outdoor environment then moves toward the indoor environment 10. When the user enters the indoor wireless hot-spot 160, the mobile terminal 2 immediately detects the wireless hub 16 transmitting the field covering the indoor wireless hot-spot (step S4). The mobile terminal simultaneously sweeps a number of signaling channels of surrounding networks (these channels are also known as beacon channels). It is therefore capable of detecting and signaling its entry into the indoor wireless hot-spot (identifier SSID of the WiFi™ network). Depending on the embodiment, protocols or WEP and WPA security keys can be used to authenticate the mobile terminal.

Once the connection with the wireless hub 16 has been set up, the terminal 2 is connected to the indoor local area network 150 (step S5). This connection is effected by the Dynamic Host Control Protocol (DHCP) function, which is known in the art, enabling the indoor gateway 15 (router) to allocate an IP address to the mobile terminal 2 entering the indoor local area network.

The mobile terminal 2 then sends the information relating to setting up the user's current multimedia session, i.e. the data/parameters necessary to reproduce the multimedia session in progress, via its interface with the indoor gateway 15 (step S6). This information includes the session type (e.g. the selected media type) and the negotiated network resources (e.g. the codecs and the bandwidth used). Depending on the embodiment chosen, sending this information can be triggered either by a request from the indoor gateway after detecting the mobile terminal (connection) or directly by the mobile terminal, after its connection to the indoor local area network, if it has been programmed accordingly.

In the next step (step S7), the indoor gateway 15 analyzes the context of the indoor local area network as a function of the information relating to the multimedia session in progress transmitted by the mobile terminal to define the switching possibilities to be offered to the user, i.e. it determines which indoor device is able to handle correctly transfer of the multimedia session in progress on the mobile terminal 2. This analysis takes account of parameters such as the availability of the indoor devices connected to the gateway, the rights of the user in respect of a device that is a candidate for switching, the capacities of the indoor devices, such as the codecs implemented therein, and the available bandwidth. The object of the analysis is to establish, as a function of the multimedia session in progress on the mobile terminal, the indoor devices able to receive the transferred session correctly.

When the analysis has been effected, the user 1 is given (step S8) a list of the candidate devices of the indoor local area network 150 via their mobile terminal 2 (the list is displayed on the terminal), where appropriate with a choice of parameters relating, for example, to the codecs and to the bandwidth (high definition or not) that will be allocated to the second multimedia session B (i.e. the session to be effected on the indoor device after switching).

From this list the user selects the indoor device (for example the PC 12) of the indoor local area network 150 on which their multimedia session will continue after switching, and information corresponding to the selected device is communicated to the indoor gateway 15 (step S9).

If switching is refused, the switching process is stopped and the user continues the session as set up beforehand on their mobile terminal. Thus the user's multimedia session continues to be transported by the mobile communications network 21.

If switching to a proposed indoor device is accepted, the method of the invention continues as described below.

The parameters to be considered for switching are taken into account and sent by the indoor gateway 15 to the mobile terminal 2 (step S10). These parameters are:
- the public identity of the user, which remains unchanged during switching;
- the Contact parameter, which is modified to route the information to the terminal selected by the user in the step S9 instead of to the mobile terminal; this Contact parameter, which is defined in RFC 3261, can use the following syntax: <sip: user_name@IP_address_of_selected_indoor_device>;
- the characteristics of the media resulting from the analysis of the context in the step S7; these characteristics are indicated in the Session Description Protocol (SDP) fields; the IP address of the terminal and the send and receive ports for the medium or media used correspond to those of the selected indoor device in the indoor local area network.

These parameters are sent by the indoor gateway 15 to the mobile terminal 2 using a protocol supported by the wireless interface between the mobile terminal and the indoor gateway with which the terminal is associated (paired). For example, the Bluetooth™ Cordless Telephony Profile (CTP) protocol can be used for the Bluetooth™ technology or the 802.11b (/g) protocol, as implemented in the LiveBox™ from France Telecom™, can be used for the WiFi™ technology.

Sending these parameters between the indoor gateway and the mobile terminal can equally be effected during the preceding step S8.

However, these parameters are preferably sent at this stage (step S10) rather than in the step S8 because in particular this avoids sending information concerning all the indoor devices constituting candidates although only some of them are chosen if the user requests switching in the step S9. Moreover, at this stage, it is possible to decorrelate the network level information (choice of indoor device) from the application level information (necessary for setting up multimedia sessions). Once the terminal for switching has been selected (step S9), the indoor local area network forwards the necessary parameters for the application system to prepare to switch the session to the chosen indoor device after validation of the mobile terminal (cf. later step S11).

The mobile terminal 2 sends a switching request to the application system 20 (step S11). All the parameters mentioned above as necessary for switching are present in the request.

When the application system 20 receives the switching request, the carrier verifies that the request conforms to the user's service profile. The application system 20 then (step S12) prepares to effect the transfer from multimedia session A (initial session on the mobile terminal in the outdoor environment) to multimedia session B (session set up on the chosen indoor device in the indoor local area network).

If the network resources required for multimedia session B in the fixed network 22 and the indoor local area network 150 are not already available for the service concerned before switching, those resources are allocated (step S13).

The application system can optionally issue a notification to confirm ending of the multimedia session by the user (step S14). Depending on the service implementation possibilities, the application system can leave it to the user to end their current multimedia session A. From the point of view of the user, these means can sometimes provide for transfer without cut-off, for example by cutting a football match session sent to their mobile terminal only when actually in front of their TV (the indoor device previously chosen).

The application system terminates the multimedia session A of the user (step S15).

The network resources of the mobile network 21 that were allocated for the multimedia session A are released (step S16). Similarly, the resources of the network of the party connected to the user 1 in the multimedia session A are also released.

At this moment, the multimedia session B of the user 1 continues via the selected indoor device of the indoor local area network 150.

The multimedia session B continues until the end of the call.

Figure 3:
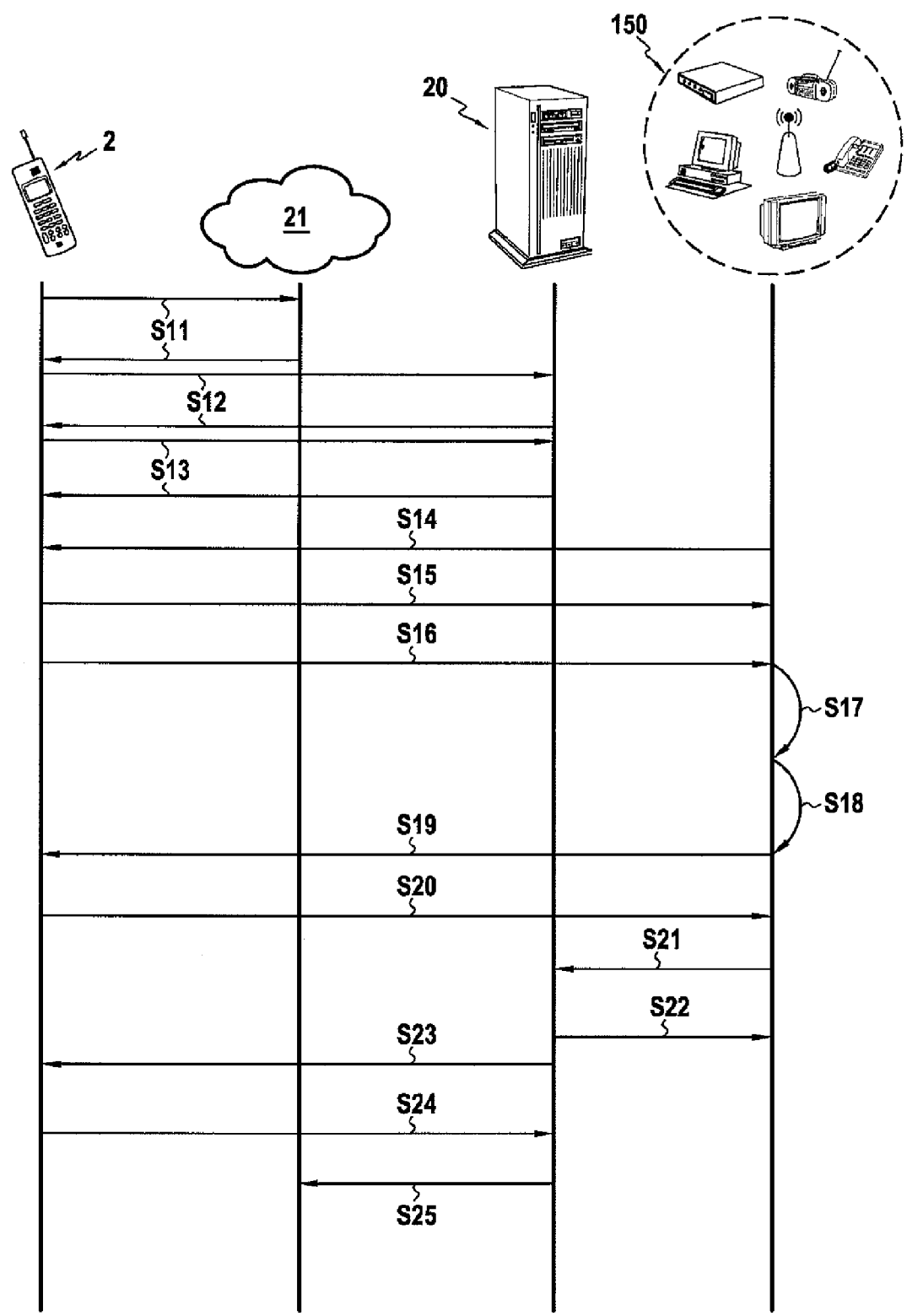
FIG. 3 shows the sequence of steps executed in a multimedia session switching method conforming to another embodiment of the invention.

A multimedia session switching method conforming to another embodiment of the invention that is used in the FIG. 1 system is described below with reference to FIG. 3. The embodiment described with reference to FIG. 3 differs from that described above with reference to FIG. 2 in that switching the multimedia session to the application system is triggered by the indoor gateway of the indoor local area network, not by the user's mobile terminal.

As before, it is considered here that:
- there is only one radio access point to the indoor wireless hot-spot 160: the wireless hub 16;
- the user 1 has only one multimedia session A in progress at the time of switching; and
- switching is effected only to an indoor device of the indoor local area network 150.

The service that is the subject matter of the multimedia session is a conversation-based service such as an instant messaging conversation (chat) between two users.

Steps S11 to S19 correspond to steps S1 to S9, respectively, described above with reference to FIG. 2. For simplicity, steps S11 to S19 are not described again here and the above description of steps S1 to S9 should be referred to.

During the step S19 the user 1 sends from their mobile terminal 2 the indoor device (for example the PC 12) of the indoor local area network 150 selected for switching its multimedia session, information corresponding to the selected device being communicated to the indoor gateway 15.

In the method of this embodiment of the invention, it is the indoor gateway 15 that requests switching the multimedia session to the selected indoor device (step S20). To this end, the indoor gateway 15 initiates a new multimedia session B, generating a new INVITE request that incorporates the parameters resulting from the analysis of the context (this method is described in RFC 3261). This new INVITE request enables the user to continue the call (i.e. the multimedia session A) with the other party provided that the step S23 has not been triggered to terminate the session A. The parameters considered for switching comprise:
- the public identity of the user, which remains unchanged during switching;
- the Contact parameter, which is modified so as to route the information to the terminal selected by the user in the preceding step S19 instead of to the mobile terminal; this Contact parameter, defined in RFC 3261, can use the following syntax: <sip: user_name@selected_indoor_device_IP_address>;
- in the SDP fields: characteristics of the medium or media, including required codecs, the IP address of the terminal, and the send and receive ports for the medium or media used corresponding to the selected device of the indoor local area network.

The subsequent steps S21 to S25 correspond to the steps S12 to S16, respectively, described above with reference to FIG. 2, which description should be referred to for the sake of simplicity. The only difference is that in the step S21 corresponding to the step S12 previously described with reference to FIG. 2 the preparation for the transfer from the multimedia session A (initial session via the mobile terminal in the outdoor environment) to the multimedia session B (session set up via the chosen indoor device in the indoor local area network) is carried out by the application system 20 in response to the switching request that here is sent by the indoor gateway 15 of the indoor local area network 150.

By switching one or multimedia sessions in progress on the user's mobile terminal to an indoor network device, the present invention offers both the user and the carrier numerous advantages.

From the point of view of the carrier, the invention:

reduces the rate of loss of subscribers from its customer base (churning) by proposing new and innovative services that are available to user regardless of the access network they use;

optimizes operating costs for mobile network services that can be provided in fixed networks at lower cost;

provides continuity of service ensuring that carriers retain their client throughout the extended session.

From the point of view of the user, the invention:

provides continuity of service ensuring the client's session is extended on entering the indoor local area network;

reduces the cost of using services by accessing them via a fixed network rather than a mobile network;

creates new uses through the option of choosing varied device;

manages mobility more easily regardless of the network used (indoor or outdoor).

The present invention can be implemented in various 3GPP mobile networks, in any type of fixed communications network and with any type of application system similar to the IMS.

The invention claimed is:

1. A method of switching a multimedia session from a mobile terminal connected to a mobile communications network to an indoor device connected to an indoor local area network including an indoor gateway, the mobile terminal and the indoor gateway being connected to an application system that sets up multimedia sessions, the method comprising:

aa) setting up a first multimedia session between the mobile terminal and the application system via the mobile communications network;

a) detecting, by the mobile terminal, a proximity of the indoor local area network;

b) selecting, by the mobile terminal, at least one indoor device capable of supporting the first multimedia session in progress on the mobile terminal;

c) validating, by the mobile terminal, the selected at least one indoor device; and d) setting up a second multimedia session between the validated indoor device and the application system.

2. The method according to claim 1, further comprising, after said step a) and before said step b), a step a1) of sending, by the mobile terminal, the indoor gateway of the indoor local area network data relating to setting up the first multimedia session in progress on the mobile terminal.

3. The method according to claim 2, wherein, in said step b), the at least one selected indoor device is selected from among at least one indoor device selected by the indoor gateway as a function of the received data relating to setting up the first multimedia session and a capacity of the at least one indoor device connected to the indoor local area network to support said first multimedia session.

4. The method according to claim 3, wherein the indoor gateway determines capacities of the at least one indoor device connected to the indoor local area network regularly or in response to reception of the data relating to setting up the first multimedia session.

5. The method according to claim 1, wherein, in said step d), the second multimedia session is set up in response to a multimedia session set-up request sent by the mobile terminal to the application system.

6. The method according to claim 5, wherein the indoor gateway sends data relating to setting up the second multimedia session between the validated indoor device and the application system to the mobile terminal.

7. The method according to claim 1, wherein, in said step d), the second multimedia session is set up in response to a multimedia session set-up request sent by the indoor gateway.

8. A mobile terminal comprising:

means for detecting a wireless field of an access hub of an indoor local area network, said indoor local area network including indoor devices connected to an indoor gateway and means for exchanging data with said gateway via a wireless connection with the access hub;

means for responding to detection of the wireless field by sending said indoor gateway information relating to setting up a multimedia session in progress between said mobile terminal and an application system;

means for displaying a list of at least one indoor device sent by the indoor gateway; and means for selecting the at least one indoor device from said list.

9. The terminal according to claim 8, further comprising:

means for sending a request to set up a new multimedia session between the selected at least one indoor device and the application system, said request being based on the information relating to setting up the multimedia session in progress between said mobile terminal and the application system.

10. A process in which a mobile terminal executes instructions set forth in a computer program product at least one of downloadable from a communications network, stored on a non-transitory computer-readable medium and executed on a microprocessor of the mobile terminal including means for detecting a wireless field of an access hub of an indoor local area network, said indoor local area network including indoor devices connected to an indoor gateway, said mobile terminal including means for exchanging data with said gateway via a wireless connection with the access hub, the computer program product comprising:

program code instructions for responding to detection of the wireless field by sending said indoor gateway information relating to setting up a multimedia session in progress between said mobile terminal and an application system; and program code instructions for displaying a list of at least one indoor device sent by the indoor gateway;

program code instructions for selecting the at least one indoor device from said list;

program code instructions for validating, by the mobile terminal, the selected at least one indoor device; and program code instructions for setting up a second multimedia session between the validated indoor device and the application system.

11. The process according to claim 10, further comprising:

program code instructions for sending a request to set up a new multimedia session between the selected at least one indoor device and the application system, said request being based on the information relating to setting up the multimedia session in progress between said mobile terminal and the application system.

12. A storage medium storing the program according to claim 10.

13. An indoor gateway connected to indoor devices in an indoor local area network, the indoor gateway comprising:
- means for determining capacities of the indoor devices connected to said indoor local area network and for determining a list of at least one indoor device able to support a multimedia session in progress between a mobile terminal and an application system as a function of the determined capacities and data relating to setting up the multimedia session in progress; and
- means for sending a request to set up a new multimedia session between at least one indoor device and the application system in response to a validation of said at least one indoor device by said mobile terminal, said request being based on the data relating to setting up the multimedia session in progress between said mobile terminal and the application system.

14. A process in which an indoor gateway executes instructions set forth in a computer program product at least one of downloadable from a communications network, stored on a non-transitory computer-readable medium and executed on a microprocessor of the indoor gateway connected to indoor devices in an indoor local area network, the computer program product comprising:

program code instructions for determining capacities of the indoor devices connected to the indoor local area network and for determining a list of at least one indoor device able to support a multimedia session in progress between a mobile terminal and an application system as a function of the determined capacities and data relating to setting up the multimedia session in progress;

program code instructions for sending a request to set up a new multimedia session between at least one indoor device and the application system in response to a validation of said at least one indoor device by said mobile terminal, said request being based on information relating to setting up the multimedia session in progress between said mobile terminal and the application system;

program code instructions for validating the selected at least one indoor device; and program code instructions for setting up a second multimedia session between the validated indoor device and the application system.

15. A storage medium storing the program according to claim 14.

16. A storage medium storing the program according to claim 11.

* * * * *